United States Patent
Hackl et al.

(10) Patent No.: US 10,688,968 B2
(45) Date of Patent: Jun. 23, 2020

(54) WINDSHIELD WIPER DEVICE

(71) Applicant: Robert Bosch GmbH, Stuttgart (DE)

(72) Inventors: Viktor Hackl, Sopron (HU); Peter Deak, Budapest (HU); Michael Weiler, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 161 days.

(21) Appl. No.: 15/036,192

(22) PCT Filed: Nov. 6, 2014

(86) PCT No.: PCT/EP2014/073900
§ 371 (c)(1),
(2) Date: May 12, 2016

(87) PCT Pub. No.: WO2015/071163
PCT Pub. Date: May 21, 2015

(65) Prior Publication Data
US 2016/0288773 A1    Oct. 6, 2016

(30) Foreign Application Priority Data

Nov. 12, 2013 (DE) .................. 10 2013 222 994

(51) Int. Cl.
*B60S 1/38* (2006.01)
*B60S 1/34* (2006.01)

(52) U.S. Cl.
CPC ............ *B60S 1/3801* (2013.01); *B60S 1/345* (2013.01); *B60S 1/3454* (2013.01); *B60S 1/3452* (2013.01);
(Continued)

(58) Field of Classification Search
CPC .... B60S 1/06; B60S 1/345; B60S 1/34; B60S 1/3454; B60S 1/38901; B60S 1/3801; B60S 1/3452
(Continued)

(56) References Cited

U.S. PATENT DOCUMENTS

| 3,131,414 | A | * | 5/1964 | Wise | ........................ | B60S 1/38 |
|   |   |   |   |   |   | 15/250.32 |
| 2008/0098555 | A1 | * | 5/2008 | Horstman | ............. | B60S 1/3431 |
|   |   |   |   |   |   | 15/250.32 |

FOREIGN PATENT DOCUMENTS

| CN |   | 1336881 A | * | 2/2002 | ................ | B60S 1/04 |
| DE | 102004063178 A1 | * | 7/2006 | ............ | B60S 1/3452 |

(Continued)

OTHER PUBLICATIONS

International Search Report for Application No. PCT/EP2014/073900 dated Feb. 4, 2015 (English Translation, 3 pages).

*Primary Examiner* — Monica S Carter
*Assistant Examiner* — Katina N. Henson
(74) *Attorney, Agent, or Firm* — Michael Best & Friedrich LLP

(57) ABSTRACT

The invention relates to a windshield wiper device (100) for a vehicle having a fastening element (52), in particular a motor vehicle. The windshield wiper device (100) comprises a mounting element (40), which is designed to be mounted on the fastening element (52), and a wiper blade (2) having an elongated upper part (10) and an elongated lower part (12), which parts are at least partially flexible. Furthermore, a plurality of connection elements (18) for connecting the upper part (10) and the lower part (12) are provided, wherein the connection elements (18) are spaced apart from one another along a longitudinal extension (8) of the wiper blade (2). The connection elements (18) are configured to allow a movement of the upper part (10) and the lower part (12)
(Continued)

relative to one another with a motion component along a longitudinal extension (8) of the wiper blade (2). The wiper blade (2) further comprises a fastening part (20) on the wiper-blade side. The fastening part (20) on the wiper-blade side is configured such that by means of a movement of the fastening part (20) on the wiper-blade side relative to the mounting element (50), a first engagement can be formed in order to connect the fastening part (20) on the wiper-blade side to the mounting element (50). The windshield wiper device (100) further comprises a closure mechanism (52, 22), which is configured to fix a position of the fastening part (20) on the wiper-blade side relative to the mounting element (50) after the first engagement has been formed.

16 Claims, 3 Drawing Sheets

(52) U.S. Cl.
CPC .................. *B60S 2001/3812* (2013.01); *B60S 2001/3825* (2013.01)

(58) Field of Classification Search
USPC .......................... 15/250.32, 250.31, 250.352
See application file for complete search history.

(56) References Cited

FOREIGN PATENT DOCUMENTS

| | | | | |
|---|---|---|---|---|
| DE | 1 0201 21 07 | * | 5/2014 | ............ B60S 1/3415 |
| EP | 845394 | | 6/1998 | |
| EP | 1322507 A1 | | 7/2003 | |
| EP | 1514752 A1 | * | 3/2005 | ............ B60S 1/3889 |
| FR | 2875458 | | 3/2006 | |
| FR | 2899857 | | 10/2007 | |
| GB | 712452 A | | 7/1954 | |
| GB | 2146239 | | 4/1985 | |
| JP | 2002098114 A | * | 4/2002 | |
| WO | 2014072186 A1 | | 5/2014 | |

* cited by examiner

WINDSHIELD WIPER DEVICE

BACKGROUND OF THE INVENTION

The invention relates to a windshield wiper device for a vehicle, in particular a motor vehicle.

Windshield wiper devices typically have a wiper arm or wiper lever, wherein a wiper blade is moved on the windshield of a motor vehicle. Here, the wiper blade is moved between a first reversal point and a second reversal point. For this purpose, the wiper arm is connected by way of a drive shaft to a wiper motor. In particular on windshields with intense changes in curvature, the wiper blade easily loses contact with the windshield. This can give rise, in particular in the case of intensely curved windshields, to non-wiped wiping areas, and/or to smearing.

Since a wiping process must be optimized with regard to a multiplicity of parameters, such as for example an amount of rain falling on the windshield, a possible snow load on the windshield, the speed of the vehicle and associated wind pressure on the wiper arm, smearing cannot be reliably prevented simply by adapting the pressure of the wiper arm on the windshield. It is therefore a requirement to further improve windshield wiper devices.

For the improvement, there is a multiplicity of boundary conditions that must additionally be taken into consideration. Said boundary conditions include the outlay for production or the production costs, the material costs, but also the characteristics of the windshield wiper device, in particular the function under a variety of conditions, and the durability under a multiplicity of conditions.

Normally, in the case of windshield wiper devices, in particular in the case of wiper blades, wear phenomena occur as a result of the regular use thereof, which wear phenomena are associated with a deterioration in wiping quality. Furthermore, owing to the exposed position of windshield wiper devices on the front or rear windshield of motor vehicles, in particular when traveling through a car washing installation, there is the risk of the windshield wiper device being damaged or even torn off. In these cases, it is necessary to exchange the worn or damaged windshield wiper devices. The exchange of windshield wiper devices is traditionally relatively cumbersome, because they are normally fastened to the drive shaft by way of screw connections.

SUMMARY OF THE INVENTION

It is the object of the present invention to provide a windshield wiper device with which at least one or more of the abovementioned disadvantages are alleviated or substantially do not arise.

According to one aspect of the present invention, a windshield wiper device for a vehicle having a fastening element, in particular a motor vehicle, is proposed. The windshield wiper device comprises an installation element, which is designed for being installed on the fastening element, and a wiper blade having an elongate upper part and an elongate lower part, which are at least partially of flexible form. Furthermore, multiple connecting elements for connecting the upper part and the lower part are provided, wherein the connecting elements are spaced apart from one another along a longitudinal extent of the wiper blade. The connecting elements are designed to permit a movement of the upper part and of the lower part relative to one another with a movement component along a longitudinal extent of the wiper blade. Furthermore, the wiper blade comprises a wiper blade-side fastening part. The wiper blade-side fastening part is configured such that, by way of a movement of the wiper blade-side fastening part relative to the installation element, a first engagement action can be realized in order to connect the wiper blade-side fastening part to the installation element. The windshield wiper device furthermore comprises a latch mechanism which is designed to fix a position of the wiper blade-side fastening part relative to the installation element after the realization of the first engagement action.

According to a further aspect of the present invention, a method for the installation of a windshield wiper device is provided. The method comprises providing a windshield wiper device as per the embodiments described herein. The method furthermore comprises fastening the wiper blade-side fastening part to the installation element by realization of the first engagement action between the wiper blade-side fastening part and the installation element and rotation of the wiper blade-side fastening part relative to the installation element about an axis of rotation which runs substantially transversely with respect to the longitudinal extent of the wiper blade, in order to fix a position of the wiper blade-side fastening part relative to the installation element.

Preferred embodiments and special aspects of the invention will emerge from the dependent claims, from the drawings and from the present description.

With the windshield wiper device described herein according to embodiments described herein, and by way of the method for the installation of the windshield wiper device, a windshield wiper device is provided which can be installed and uninstalled in a simple manner. The windshield wiper device, which is preferably of fin-ray type, is installed in rotational fashion onto an installation element, the latter designed for being installed on the fastening element of the vehicle, and is uninstalled therefrom in rotational fashion. Accordingly, in the event of damage, the windshield wiper device can be easily exchanged or can be easily removed before traveling through a car washing installation, and subsequently installed again.

In embodiments of the disclosure that may be combined with other embodiments described herein, the wiper blade-side fastening part has at least one first engagement element which is designed to realize the first engagement action with at least one first securing element of the installation element. Thus, a windshield wiper device is provided with which a position of the wiper blade-side fastening part relative to the installation element can be fixed.

In embodiments of the disclosure that may be combined with other embodiments described herein, the first securing element is formed as a cutout in the installation element. Thus, the windshield wiper device can be produced easily and inexpensively.

In embodiments of the disclosure that may be combined with other embodiments described herein, the first engagement element is formed as a projection. Thus, the windshield wiper device can be produced easily and inexpensively.

In embodiments of the disclosure that may be combined with other embodiments described herein, the first engagement element forms an axis for a rotation of the wiper blade-side fastening part relative to the installation element. Thus, a windshield wiper device is provided with which a position of the wiper blade-side fastening part relative to the installation element can be fixed for example by way of the rotation about the axis.

In embodiments of the disclosure that may be combined with other embodiments described herein, the first engagement element is designed to engage into the first securing element and to be guided along the first securing element by the movement of the wiper blade-side fastening part relative to the installation element. Thus, a windshield wiper device is provided with which a position of the wiper blade-side fastening part relative to the installation element can be fixed in a stable manner.

In embodiments of the disclosure that may be combined with other embodiments described herein, the latch device has a second engagement element and a second securing element which are designed to realize a second engagement action with one another in order to fix the position of the wiper blade-side fastening part relative to the installation element after the realization of the first engagement action. Thus, a windshield wiper device is provided with which a position of the wiper blade-side fastening part relative to the installation element can be fixed in a stable manner.

In embodiments of the disclosure that may be combined with other embodiments described herein, the second engagement element is formed on the wiper blade-side fastening part and the second securing element is formed on the installation element, or the second engagement element is formed on the installation element and the second securing element is formed on the wiper blade-side fastening part. Thus, the engaging action during the installation process can be guided in a secure and stable manner, such that a position of the wiper blade-side fastening part relative to the installation element can be fixed in a secure and stable manner.

In embodiments of the disclosure that may be combined with other embodiments described herein, the latch device has a release mechanism which is designed to eliminate the second engagement action. Thus, a windshield wiper device is provided which can be installed and uninstalled in a simple manner.

BRIEF DESCRIPTION OF THE DRAWINGS

Exemplary embodiments of the invention are illustrated in the figures and will be described in more detail below. In the figures.

DETAILED DESCRIPTION

Below, unless stated otherwise, the same reference designations are used for identical elements and elements of identical action.

Figure 1A:
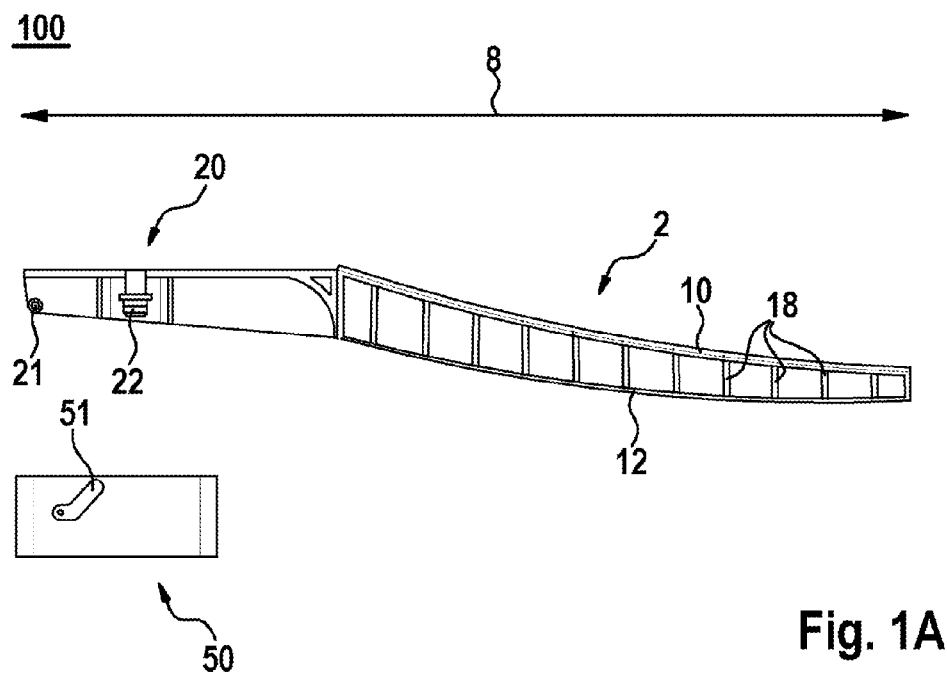
FIG. 1A is a schematic illustration of a windshield wiper device according to embodiments of the disclosure in an unfastened state.
Figure 1B:
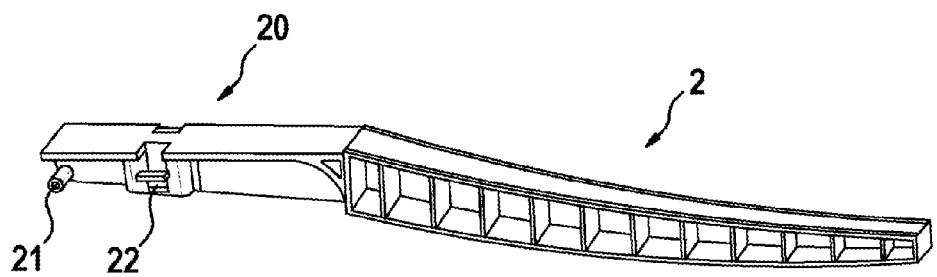
FIG. 1B is a schematic illustration of the wiper blade of the windshield wiper device according to embodiments of the disclosure.

FIGS. 1A and 1B schematically illustrate a windshield wiper device 100 according to embodiments of the disclosure. FIG. 1A is a schematic illustration of the windshield wiper device 100 according to embodiments of the disclosure in an unfastened state, and FIG. 1B is a schematic illustration of the wiper blade 2 of the windshield wiper device 100 according to embodiments of the disclosure.

In embodiments of the disclosure, the windshield wiper device 100 comprises a fin-ray structure, a wiper blade-side fastening part 20, and an installation element 50.

In embodiments of the disclosure, the windshield wiper device 100 comprises a wiper blade 2 with an elongate upper part 10 and with an elongate lower part 12, which are at least partially of flexible form. Furthermore, multiple connecting elements 18 for connecting the upper part 10 and the lower part 12 are provided, wherein the connecting elements 18 are spaced apart from one another along a longitudinal extent 8 of the windshield wiper device 100. The connecting elements 18 are designed to permit a movement of the upper part 10 and of the lower part 12 relative to one another with a movement component along a longitudinal extent 8 of the windshield wiper device 100.

In embodiments of the disclosure that may be combined with other embodiments, the wiper blade 2 has a wiper blade-side fastening part 20 which is connectable to the installation element 50. In typical embodiments, the installation element 50 ("arm head") can be installed on a vehicle, for example on a drive shaft for the windshield wiper device. The wiper blade-side fastening part 20 and the installation element 50 are configured such that, by way of a movement of the wiper blade-side fastening part 20 relative to the installation element 50, a first engagement action can be realized in order to connect the wiper blade-side fastening part 20 to the installation element 50. The windshield wiper device 100 furthermore comprises a latch mechanism which is designed to fix a position of the wiper blade-side fastening part 20 relative to the installation element 50 after the formation of the first engagement action.

Typically, after the realization of the first engagement action, the wiper blade-side fastening part 20 is rotated relative to the installation element 50 such that, by way of the latch mechanism, the position of the wiper blade-side fastening part 20 relative to the installation element 50 after the realization of the first engagement action is fixed.

In embodiments of the disclosure that may be combined with other embodiments, the wiper blade-side fastening part 20 may, in embodiments of the windshield wiper device 100 that may be combined with other embodiments, have a first engagement element 21. The first engagement element 21 is typically designed to realize the first engagement action with a first securing element 51 of the installation element 50. In embodiments described herein, the first engagement element 21 may realize the first engagement action with the first securing element 51 by way of the movement.

In some embodiments of the disclosure that may be combined with other embodiments, the first engagement element 21 is in the form of a projection. In typical embodiments, the first engagement element 21 is formed from a projection on a side surface of the wiper blade-side fastening part 20. Thus, with the embodiments described herein, the wiper blade-side fastening part 20 can be produced particularly easily and inexpensively.

In some embodiments of the disclosure that may be combined with other embodiments, the first engagement element 21 forms an axis for a rotation of the wiper blade-side fastening part 20 relative to the installation element 50. In typical embodiments, by way of the rotation of the wiper blade-side fastening part 20 relative to the installation element 50, the position of the wiper blade-side fastening part 20 relative to the installation element 50 after the realization of the first engagement action can be fixed by way of the latch mechanism.

Typically, after the realization of the first engagement action, the wiper blade-side fastening part 20 is rotated relative to the installation element 50 such that, by way of the latch mechanism, the position of the wiper blade-side fastening part 20 relative to the installation element 50 after the realization of the first engagement action is fixed.

In some embodiments of the disclosure that may be combined with other embodiments, the first engagement element 21 may be of cylindrical form, for example in the form of a projection. In typical embodiments, the first securing element 51 may be in the form of a cutout in the installation element 50. For example, the first securing element 51 may be formed as a cutout in a side surface of the installation element 50. Typically, the first securing element 51 is designed such that the first engagement element 21 of the wiper blade-side fastening part 20 can engage into the first securing element 51 of the installation element 50 in order to realize the first engagement action.

In some embodiments of the disclosure that may be combined with other embodiments, the first engagement element 21 is designed to engage into the first securing element 51 and to be guided along the first securing element 51 by the movement of the wiper blade-side fastening part 20 relative to the installation element 50. The movement may typically be a substantially linear movement.

In typical embodiments, the first securing element 51 may have an elongate form. For example, the first securing element 21 may be in the form of an elongated hole. The elongate form or the elongated hole typically has at least one bend and/or a curvature, as shown by way of example in FIG. 1A. Thus, a windshield wiper device 100 is provided with which a position of the wiper blade-side fastening part 20 relative to the installation element 50 can be fixed in stable fashion.

In some embodiments of the disclosure that may be combined with other embodiments, the windshield wiper device 100 has the latch device. The latch device typically has a second engagement element 22 and a second securing element (for example reference designation 52 in FIG. 3B), which are designed to realize the second engagement action with one another in order to fix the position of the wiper blade-side fastening part 20 relative to the installation element 50 after the realization of the first engagement action. It is for example possible, after the realization of the first engagement action, for the wiper blade-side fastening part 20 to be rotated relative to the installation element 50 in order to realize the second engagement action, such that the position of the wiper blade-side fastening part 20 relative to the installation element 50 is fixed. This will be discussed in more detail with reference to FIGS. 2A-C.

In some embodiments of the disclosure that may be combined with other embodiments, the latch device has a release mechanism which is designed to eliminate the second engagement action. For example, the release mechanism is in the form of a button or pushbutton. Thus, the second engagement action can be easily eliminated by a user, and the windshield wiper device 100 uninstalled.

Figure 2A:
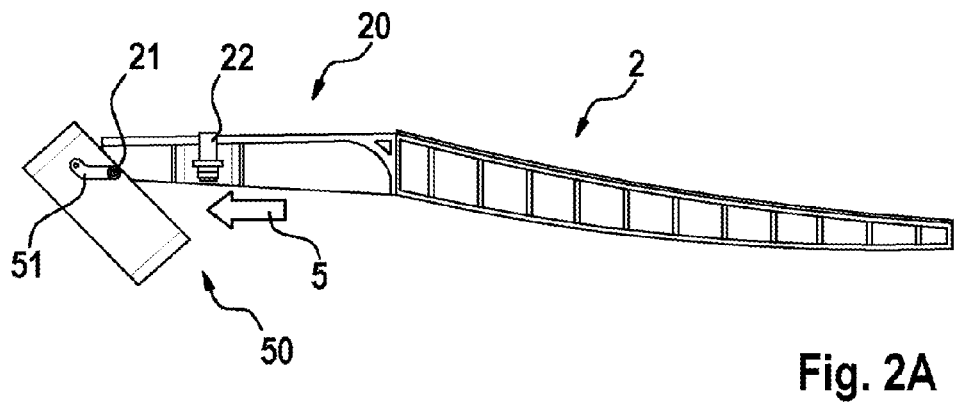
FIGS. 2A-C are schematic illustrations of the installation process of the windshield wiper device according to embodiments of the disclosure.
Figure 2B:
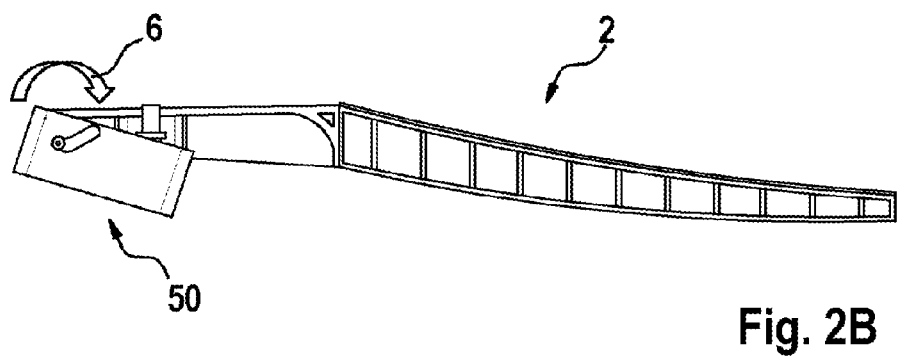
Figure 2C:
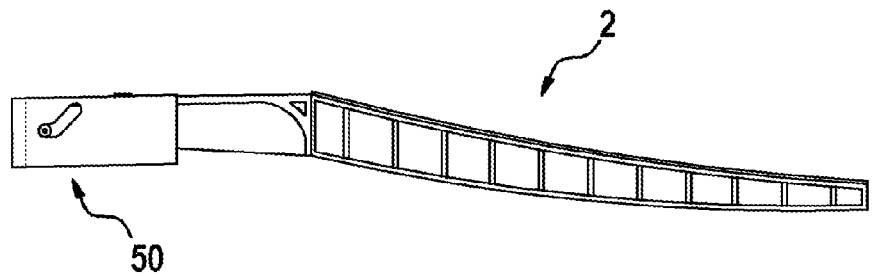

FIGS. 2A-C are schematic illustrations of the installation process of the windshield wiper device 100 according to embodiments of the disclosure.

In embodiments of the disclosure that may be combined with other embodiments, for the installation of the wiper blade 2 on the installation element 50 by way of the movement of the wiper blade-side fastening part 20 relative to the installation element 50, the first engagement action between the wiper blade-side fastening part 20 and the installation element 50 is realized in order to connect the wiper blade-side fastening part 20 to the installation element 50. For uninstallation, by way of a movement in the opposite direction to the movement during installation, the connection between the wiper blade-side fastening part 20 and the installation element 50 is released. The movement is indicated in FIG. 2A by the arrow 5. The movement may be a substantially linear movement which is substantially parallel to the longitudinal extent 8 of the wiper blade 2.

As shown in FIG. 2A, in typical embodiments, during the installation of the windshield wiper device 100, the wiper blade-side fastening part 20 is inserted into the installation element 50, for example into the first securing element 51. Here, the first engagement element 21 of the wiper blade-side fastening part 20 engages into the first securing element 51. The first engagement element 21 is guided along the first securing element 51, as indicated in FIG. 2A by the arrow 5. In typical embodiments, the first engagement element 21 is guided along the first securing element 51 as far as a stop position. In the example shown in FIG. 2A, the first engagement element 21 is guided along the first securing element 51 of elongate form as far as a stop position. Here, the stop position may be an end of the first securing element 51, against which the first engagement element 21 abuts or bears. Typically, the stop position is situated after a bend of the first securing element 51. In this way, it can be ensured that a position after the realization of the first engagement action between the wiper blade-side fastening part 20 and the installation element 50 is stable and unchangeable.

In embodiments that may be combined with other embodiments, the wiper blade-side fastening part 20 and the installation element 50 are configured such that, by rotation of the wiper blade-side fastening part 20 relative to the installation element 50 about an axis of rotation, a position of the wiper blade-side fastening part 20 relative to the fastening element 50 can be fixed by way of the latch mechanism. In embodiments, the axis of rotation is substantially perpendicular to the longitudinal extent 8 of the windshield wiper device 100 and substantially perpendicular to a working or wiping plane of the wiper blade 2. In some embodiments, the axis of rotation is substantially perpendicular to a windshield of the vehicle. In FIG. 2B, the direction of rotation is indicated by the arrow 6. Typically, the axis of rotation is formed by the first engagement element 21.

In embodiments that may be combined with other embodiments, the installation element 50 may have a gap into which a part of the wiper blade-side fastening part 20 can be inserted during the rotation, as shown in particular in FIG. 2B.

In typical embodiments, the latch device may have a second engagement element 22 and a second securing element (for example reference designation 52 in FIG. 3B), which are designed to realize the second engagement action with one another in order to fix the position of the wiper blade-side fastening part 20 relative to the installation element 50 after the realization of the first engagement action. As already discussed, it is for example possible, after the realization of the first engagement action, for the wiper blade-side fastening part 20 to be rotated relative to the installation element 50 in order to realize the second engagement action, such that the position of the wiper blade-side fastening part 20 relative to the installation element 50 is fixed.

Thus, by way of the embodiments described herein, a windshield wiper device is provided which can be installed and uninstalled in a simple manner. Accordingly, the windshield wiper device can be easily exchanged in the event of damage, or can be easily removed before traveling through a car washing installation and subsequently installed again.

Figure 3A:
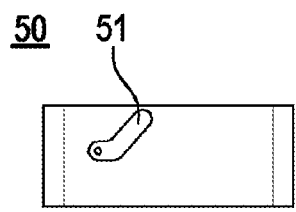
FIGS. 3A and 3B show views of the installation element of the windshield wiper device according to embodiments of the disclosure.
Figure 3B:
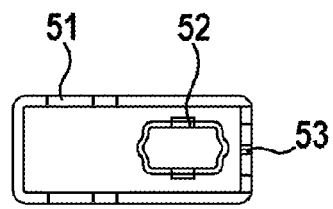

FIGS. 3A and 3B show perspective views of the installation element 50 of the windshield wiper device 100 according to embodiments of the disclosure.

In embodiments that may be combined with other embodiments, the installation element 50 has the first securing element 51. The first securing element 51 may be formed in or on a side surface of the installation element 50, as shown by way of example in FIGS. 3A and 3B. Typically, the installation element 50 may have two or more first securing elements 51. For example, in each case at least one first securing element 51 may be formed on two opposite sides of the installation element 50. The number of first securing elements 51 typically corresponds to the number of first engagement elements 21.

In embodiments that may be combined with other embodiments, the latch device has the second engagement element 22 and the second securing element 52, which are designed to realize the second engagement action with one another in order to fix the position of the wiper blade-side fastening part 20 relative to the installation element 50 after the realization of the first engagement action. Typically, the second engagement element 22 and the second securing element 52 form a detent mechanism or a click-action mechanism.

As shown by way of example in FIGS. 1 and 3B, the second engagement element 22 may be formed on the wiper blade-side fastening part 20, and the second securing element 52 may be formed on the installation element 50. In other embodiments (not shown), the second engagement element may be formed on the installation element 50, and the second securing element may be formed on the wiper blade-side fastening part 20.

In embodiments that may be combined with other embodiments, the wiper blade-side fastening part 20 can be inserted into the installation element 50. For example, the installation element 50 may have a substantially rectangular form.

In embodiments that may be combined with other embodiments, the installation element may have the gap 53 into which a part of the wiper blade-side fastening part 20 can be inserted for example during the rotation of the wiper blade-side fastening part 20 relative to the installation element 50, as shown in particular in FIG. 2B.

Referring to FIGS. 3A and 3B, a clip-type fastening (latch mechanism), an elongated hole (first securing element 51) and the gap 53 are shown on the arm head (installation element 50).

Below, exemplary embodiments of wiper systems will be described for which the windshield wiper device described herein can advantageously be used. It is however basically possible for the fastening device described herein to also be used for other windshield wiper devices.

Figure 4A:
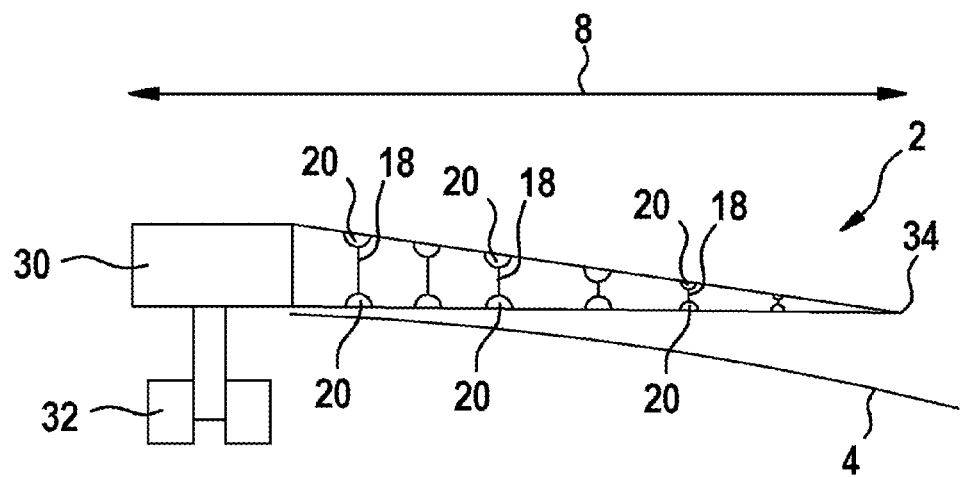
FIG. 4A is a schematic illustration of a further exemplary embodiment of a windshield wiper device according to the invention in the form of a wiper arm with integrated wiper blade in a basic position.
Figure 4B:
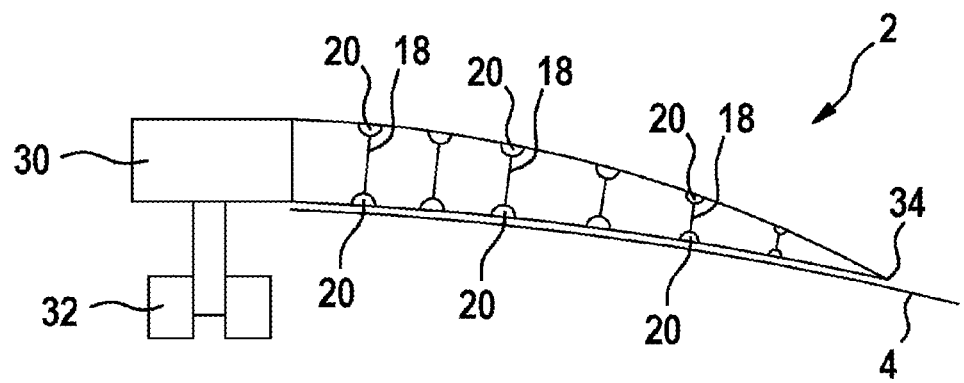
FIG. 4B is a schematic illustration of the wiper arm with integrated wiper blade as per FIG. 4A in a position placed against a windshield.

FIGS. 4A and 4B are schematic illustrations of a wiper blade 2 in a basic position (FIG. 4A) and in a position placed against a windshield 4 (FIG. 4B) according to embodiments of the windshield wiper device 10 of the disclosure. The wiper blade 2 serves for wiping a windshield 4 of a vehicle, which is for example a motor vehicle, in particular an automobile. The wiper blade 2 is normally attached to a windshield wiper arm which, for the wiping action, is driven by way of a motor. For this purpose, the wiper blade 2 has a bracket by which it can be fastened to the windshield wiper arm. In FIG. 4A, the wiper blade 2 is situated in a basic position, in which it is at least partially raised from the windshield 4. The wiper blade 2 has a longitudinal extent 8 and has an elongate upper part 10 and a likewise elongate lower part 12. The longitudinal extents of the upper part 10 and of the lower part 12 substantially correspond to the longitudinal extent 8 of the wiper blade 2.

Both the upper part 10 and the lower part 12 are, or may be designed as, flexible beams which, in FIGS. 4A and 4B, are for example in each case of unipartite form. This makes it possible to realize a particularly stable construction. It is likewise possible for only in each case one part of the upper part 10 and/or of the lower part 12 to be designed to be flexible. Furthermore, it is alternatively possible for the upper part 10 to be of multi-part form.

In some embodiments that may be combined with the other embodiments described here, for the upper part 10 and/or the lower part 12, a material is used which has a modulus of elasticity which lies in a range between 0.005 kN/mm$^2$ and 0.5 kN/mm$^2$, in particular 0.01 kN/mm$^2$ and 0.1 kN/mm$^2$. This makes it possible to realize suitable flexibility of the upper part 10 and of the lower part 12. Together with a suitably designed cross-sectional area of the upper part 10 and of the lower part 12, optimum flexural stiffness is thus realized. The upper part 10 and the lower part 12 are arranged so as to be situated opposite one another. One end of the upper part 10 is fixedly connected, at an outer connecting position 34, to one end of the lower part 12. Otherwise, the upper part 10 and the lower part 12 are spaced apart from one another.

The upper part 10 and the lower part 12 are connected to one another by way of connecting elements 18. In particular in the basic position of the wiper blade 2, said connecting elements run approximately transversely with respect to the longitudinal extent 8 of the wiper blade 2. The connecting elements 18 are fastened by way of rotary joints 20 to inner longitudinal sides, which face toward one another, of the upper part 10 and of the lower part 12. Here, the rotary joints 20 are hinges. In particular, the rotary joints 20 may be in the form of film hinges. This is advantageous in particular if the upper part 10, lower part 12 and/or connecting elements 18 are produced from a plastics material or are lined with a suitable plastics material.

In typical embodiments described here, which may be combined with other embodiments described here, a rotary joint is selected from the group comprising: a hinge, a film hinge, a narrowing of the material in order to realize relatively low stiffness along a torsional axis, a joint with an axis of rotation, a means for connecting the upper part to the connecting element or for connecting the lower part to the connecting element, which means permits the displacement of the lower part relative to the upper part along the longitudinal extent, etc.

Embodiments in which the joint is provided by a film hinge thus provide a very simple way of providing the joints for a fin-ray wiper. The wiper blade 2 may be provided in unipartite, in particular ready-from-the-mold form. In typical embodiments, the windshield wiper device, in particular the wiper blade, is produced from one or more materials from a group comprising: thermoplastic elastomer (TPE), for example TPE-S, TPE-O, TPE-U, TPE-A, TPE-V and TPE-E. The film hinges may exhibit high extensibility. This may be achieved for example by way of a material selected from the group PP, PE, POM and PA. Alternatively, the film hinges may be produced from one or more materials from a group comprising: thermoplastic elastomer (TPE), for example TPE-S, TPE-O, TPE-U, TPE-A, TPE-V and TPE-E.

The connecting elements 18 are spaced apart from one another along the longitudinal extent of the wiper blade 2. The spacings between in each case two adjacent connecting elements 18 are equal. Said spacings may however also be selected so as to differ. The spacings are advantageously less than 50 mm, in particular less than 30 mm. In this way, it is possible to ensure a particularly high level of flexibility of the windshield wiper device, in particular of its lower part, and good adaptation to the curvature and changes in curvature of the windshield to be wiped.

The connecting elements 18 are, in particular in the basic position of the wiper blade 2, fastened to the lower part 12 such that their longitudinal axes run at angles 26 of between 65° and 115°, in particular between 75° and 105°, with respect to the lower part 12. The angles particularly advantageously lie between 80° and 100°. This advantageously ensures that a force acting on the lower part is transmitted in a particularly effective manner to the upper part. Furthermore, a particularly stable windshield wiper device can be realized in this way. A corresponding situation applies to the fastenings of the connecting elements 18 to the upper part 10.

The spacings between the upper part 10 and the lower part 12 are defined primarily by the lengths of the connecting elements 18. The lengths of the connecting elements 18 increase in size proceeding from the outer connecting position as far as approximately the locations at which a fastening part 30 begins. In this way, in the side view of the wiper blade 2 as per FIG. 4A, the upper part 10 and lower part 12 form a wedge. The connecting elements 18 are designed to be resistant to buckling.

FIG. 4B is a schematic illustration of the wiper blade 2 as per FIG. 4A in a position placed against the windshield 4. Since the windshield 4 has a curvature, it is the case that, when the wiper blade 2 bears against the windshield 4, contact pressure forces act on the lower part 12. Since the upper part 10 and the lower part 12 are flexible beams and the connecting elements 18 are mounted rotatably on the upper part 10 and lower part 12, the upper part 10 and the lower part 12 are displaceable relative to one another. Owing to the pressure forces that act on the lower part 12 from below, the wiper blade 2 bends in the direction from which the pressure forces originate, and bears exactly against the curvature of the windshield 4.

Owing to the construction of the embodiments described here, it is the case that, when a force is exerted on the lower part (by the windshield 4), the lower part bends in the direction from which the force acts. This is realized by way of the connection of the upper part 10 and of the lower part, the shape, and by way of rotary joints at the connection between the connecting elements and the upper part and lower part.

In the illustration as per FIG. 4B, there is a small spacing between the wiper blade 2 and the windshield 4, which spacing serves here merely for the illustration of the windshield 4 and of the wiper blade 2 and, in reality, substantially does not exist when the wiper blade 2 bears against the windshield 4. Furthermore, a wiper lip is typically situated on the lower side, averted from the upper part 10, of the lower part 12, which wiper lip is set down on the windshield 4 for wiping purposes. For reasons of clarity, the wiper lip is not illustrated in FIGS. 4A and 4B.

A windshield wiper device according to embodiments described here utilizes the effect of tailfins of certain fish species, which, under the action of lateral pressure, do not deflect in the direction of the pressure but curve in the opposite direction, that is to say in the direction from which the pressure originates. This principle is also referred to as the "fin-ray" principle. In this way, a windshield wiper device according to the embodiments described herein has the advantage of improved adaptation to a windshield of a motor vehicle. In the case of a conventional windshield wiper blade, the upper part thereof is conventionally rigid, that is to say is not designed to be flexible.

FIGS. 4A and 4B show a wiper blade 2 with a longitudinal extent 8. The windshield wiper device has only one connecting position 34. Such an arrangement is commonly used for rear windshield wipers. The disclosure is however not restricted to rear windshield wipers, and the windshield wiper device according to the embodiments described herein may also be used for front windshield wipers. Optional refinements and details such as are described in the individual embodiments may be used generally for both variants of an arrangement of a windshield wiper device.

FIGS. 4A and 4B also show a fastening part 30 to which the wiper blade 2 is attached. The fastening part 30 is connected to a wiper motor 32 which drives the fastening part 30 in order to wipe the windshield 4. The fastening part 30 may be designed according to embodiments of the present disclosure and comprise the wiper blade-side fastening part, the installation element and the latch mechanism.

The wiper blade 2 is of wedge-shaped design, wherein one end of the upper part 10 is fixedly connected at an outer connecting position 34 to one end of the lower part 12. The respective other ends of the upper part 10 and of the lower part 12 are fastened to the fastening part 30.

In FIG. 4A, the wiper blade 2 is illustrated in its position in which it has not been placed against the windshield, such that the lower part 12 is of substantially straight form. According to yet further embodiments that may be combined with other embodiments, the lower part is, in the unloaded state, of convex form, that is to say with a curvature which projects away from the upper part in a central region. Upon coming into contact with a windshield, the windshield wiper device as per the embodiments described here can typically then, proceeding from the convex shape of the lower part, assume the corresponding concave shape, which adapts to the windshield, of the lower part.

Figure 5:
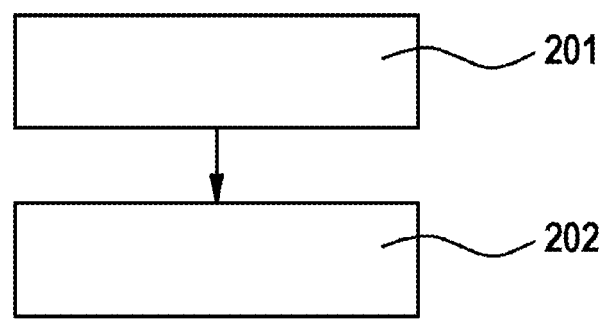
FIG. 5 shows a flow diagram illustrating embodiments of the method for the installation of a windshield wiper device according to embodiments of the disclosure.

FIG. 5 illustrates a flow diagram for illustrating embodiments of the method 200 for the installation of a windshield wiper device. In embodiments of the method 200, the method 200 comprises providing 201 a windshield wiper device according to the embodiments described herein. Furthermore, the method comprises fastening 202 the wiper blade-side fastening part 20 to the installation element 50 by realization of the first engagement action between the wiper blade-side fastening part 20 and the installation element 50 and rotation of the wiper blade-side fastening part 20 relative to the installation element 50 about an axis of rotation, which runs substantially transversely with respect to the longitudinal extent 8 of the wiper blade 2, in order to fix a position of the wiper blade-side fastening part 20 relative to the installation element 50 by way of the latch mechanism.

Thus, by way of the embodiments of the windshield wiper device described herein and by way of the method for installation of the windshield wiper device, a windshield wiper device is provided which can be installed and uninstalled in a simple manner. Accordingly, the windshield wiper device can be easily exchanged in the event of damage, or can be easily removed before traveling through a car washing installation and subsequently installed again.

What is claimed is:

1. A windshield wiper device (100) for a vehicle having a fastening element, the device comprising
    an installation element (50) which is configured for being installed on the fastening element, the installation element (50) including at least one first securing element (51), wherein the at least one first securing element (51) is an elongate slot in a side wall of the installation element (50), wherein the slot includes a first linear section, a second linear section, and a bend therebetween, and
    a wiper blade (2) having
        an elongate upper part (10) which is at least partially of flexible form,
        an elongate lower part (12) which is at least partially of flexible form,
        multiple connecting elements (18) connecting the upper part (10) and the lower part (12), wherein the connecting elements (18) are spaced apart from one another along a longitudinal extent (8) of the wiper blade (2), and wherein the connecting elements (18) are configured to permit a movement of the upper part (10) and of the lower part relative to one another with a movement component along the longitudinal extent (8) of the wiper blade (2),
        a wiper blade-side fastening part (20), wherein the wiper blade-side fastening part (20) is configured such that, by way of a movement of the wiper blade-side fastening part (20) relative to the installation element (50), a first engagement action can be realized in order to connect the wiper blade-side fastening part (20) to the installation element (50),
    wherein the wiper blade-side fastening part (20) includes at least one first engagement element (21) which is configured to realize the first engagement action with the at least one first securing element (51) of the installation element (50), wherein the at least one first engagement element (21) is a protrusion extending from a side wall of the wiper blade-side fastening part (20) and at least partially into the slot, wherein the entire slot extends in an elongate direction within a plane that is parallel to the longitudinal extent (8) and that is configured to extend perpendicular to a windshield, and wherein the first engagement action includes movement of the protrusion along the slot from the first section to the second section, such that the installation element (50) moves both linearly relatively to the wiper blade (2) along a direction parallel to the longitudinal extent (8), and also rotates relative to the wiper blade (2), and
    a latch mechanism (52, 22) which is configured to fix a position of the wiper blade-side fastening part (20) relative to the installation element (50) after the realization of the first engagement action.

2. The windshield wiper device (100) as claimed in claim 1, wherein the first engagement element (21) forms an axis for a rotation of the wiper blade-side fastening part (20) relative to the installation element (50).

3. The windshield wiper device (100) as claimed in claim 1, wherein the latch mechanism (22, 52) has a second engagement element (22) and a second securing element (52), which are configured to realize, by way of the rotation of the wiper blade-side fastening part (20) about an axis of rotation that extends perpendicular to the plane, a second engagement action with one another in order to fix the position of the wiper blade-side fastening part (20) relative to the installation element (50) after the realization of the first engagement action.

4. The windshield wiper device (100) as claimed in claim 3, wherein the second engagement element (22) is formed on the wiper blade-side fastening part (20) and the second securing element (52) is formed on the installation element (50), or wherein the second engagement element is formed on the installation element (50) and the second securing element is formed on the wiper blade-side fastening part (20).

5. The windshield wiper device (100) as claimed in claim 3, wherein the latch mechanism device (22, 52) has a release mechanism which is configured to eliminate the second engagement action.

6. A method (200) for the installation of a windshield wiper device, comprising:
    providing (201) a windshield wiper device (100) as claimed in claim 1, and
    fastening (202) the wiper blade-side fastening part (20) to the installation element (50) by realization of the engagement action between the wiper blade-side fastening part (20) and the installation element (50) and rotation of the wiper blade-side fastening part (20) relative to the installation element (50) about an axis of rotation which runs substantially transversely with respect to the longitudinal extent (8) of the wiper blade (2), in order to fix a position of the wiper blade-side fastening part (20) relative to the installation element (50).

7. The windshield wiper device (100) as claimed in claim 1, wherein the first linear section is longer than the second linear_section.

8. The windshield wiper device (100) as claimed in claim 1, wherein the elongate slot is fully enclosed on all sides by the side wall of the installation element (50).

9. The windshield wiper device (100) as claimed in claim 8, wherein the elongate slot and the side wall of the installation element (50) together define a stop, so that the projection is configured to move linearly along the first linear section, rotate through the bend, and then move linearly along the second section within the elongate slot until it reaches the stop.

10. The windshield wiper device (100) as claimed in claim 1, wherein the installation element (50) includes a gap (53) into which a portion of the wiper blade-side fastening part is configured to extend during assembly.

11. The windshield wiper device (100) as claimed in claim 1, wherein the bend forms an obtuse angle between the first linear section and the second linear section.

12. The windshield wiper device (100) as claimed in claim 1, wherein the protrusion has a diameter, and wherein the first linear section has a length greater than the diameter.

13. The windshield wiper device (100) as claimed in claim 1, wherein the protrusion extends laterally outwardly and away from the side wall of the wiper blade-side fastening part (20) and has a distal, free end extending at least partially into the slot.

14. The windshield wiper device (100) as claimed in claim 1, wherein the movement of the wiper blade-side fastening part (20) relative to the installation element (50) includes movement about an axis of rotation that extends perpendicular to the longitudinal extent (8) and perpendicular to the plane.

15. The windshield wiper device (100) as claimed in claim 14, wherein the elongate slot and protrusion are arranged such that the protrusion is configured to move linearly along the first linear section of the elongate slot, then move through the bend of the elongate slot, and then move linearly along the second linear section of the elongate slot, and wherein the rotation of the wiper blade-side fastening part (20) relative to the installation element (50) is configured to occur when the protrusion is in the bend.

16. The windshield wiper device (100) as claimed in claim 1, wherein the protrusion extends laterally away from an outer surface of the side wall of the wiper blade-side fastening part (20).

\* \* \* \* \*